(12) United States Patent
Fujinuma (10) Patent No.: US 7,649,641 B2
(45) Date of Patent: Jan. 19, 2010

(54) PRINTING MEDIUM, IMAGE FORMING APPARATUS, AND PRINTING METHOD

(75) Inventor: Yasutaka Fujinuma, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1021 days.

(21) Appl. No.: 10/876,153

(22) Filed: Jun. 24, 2004

(65) Prior Publication Data

US 2005/0007631 A1 Jan. 13, 2005

(30) Foreign Application Priority Data

Jul. 8, 2003 (JP) ............................. 2003-271807

(51) Int. Cl.
| | |
|---|---|
| G06K 15/02 | (2006.01) |
| G06F 7/04 | (2006.01) |
| G08B 29/00 | (2006.01) |
| H04L 9/32 | (2006.01) |
| G08B 19/00 | (2006.01) |
| G06F 17/30 | (2006.01) |
| G06F 3/12 | (2006.01) |
| G06F 3/14 | (2006.01) |
| H04N 1/333 | (2006.01) |
| H04N 1/38 | (2006.01) |
| H04N 1/42 | (2006.01) |
| H04N 1/44 | (2006.01) |

(52) U.S. Cl. .................... 358/1.14; 358/1.1; 358/401; 358/1.16; 358/405; 358/406

(58) Field of Classification Search .................. 700/3; 709/208–211; 710/110; 712/31; 358/438; 726/26–33; 340/10.4, 10.41, 10.42, 5.1, 340/5.2, 5.8, 5.51, 5.6, 5.61, 5.54, 5.86; 380/255; 713/168

See application file for complete search history.

(56) References Cited

U.S. PATENT DOCUMENTS

| 4,935,962 | A | * | 6/1990 | Austin ........................ 713/159 |
|---|---|---|---|---|
| 5,621,200 | A | * | 4/1997 | Irwin et al. .................. 235/375 |
| 6,053,405 | A | * | 4/2000 | Irwin et al. .................. 235/375 |
| 6,409,401 | B1 | * | 6/2002 | Petteruti et al. ............... 400/88 |
| 6,585,154 | B1 | * | 7/2003 | Ostrover et al. ............. 235/375 |
| 6,593,853 | B1 | * | 7/2003 | Barrett et al. ............ 340/572.1 |
| 6,674,923 | B1 | * | 1/2004 | Shih et al. .................... 382/305 |
| 6,827,279 | B2 | * | 12/2004 | Teraura ....................... 235/492 |
| 6,899,476 | B1 | * | 5/2005 | Barrus et al. .................. 400/76 |
| 6,929,412 | B1 | * | 8/2005 | Barrus et al. .................. 400/76 |

(Continued)

FOREIGN PATENT DOCUMENTS

JP 11-306308 A 11/1999

(Continued)

*Primary Examiner*—Twyler L Haskins
*Assistant Examiner*—Myles D Robinson
(74) *Attorney, Agent, or Firm*—Panitch Schwarze Belisario & Nadel LLP (57) ABSTRACT

A printing medium has means for storing electronic data. The means includes an input-output unit, a first memory, a second memory, a comparison unit, and an access controller. The second memory stores data for confirming the validity of the information printed on the printing medium. The first memory stores data for controlling access to the second memory. In particular, write access to the second memory is denied unless the accessing party also submits comparison data that compare correctly with the data stored in the first memory. This protocol prevents the facile creation of counterfeit copies.

20 Claims, 5 Drawing Sheets

U.S. PATENT DOCUMENTS

| | | | |
|---|---|---|---|
| 7,003,256 B2 * | 2/2006 | Kumakura et al. | 399/366 |
| 7,037,009 B2 * | 5/2006 | Barrus et al. | 400/76 |
| 7,140,534 B2 * | 11/2006 | Miyazawa et al. | 235/375 |
| 7,184,680 B2 * | 2/2007 | Sawada | 399/84 |
| 7,273,165 B2 * | 9/2007 | Satake et al. | 235/375 |
| 7,299,990 B2 * | 11/2007 | Hoshina | 235/492 |
| 7,341,326 B2 * | 3/2008 | Kondo et al. | 347/19 |
| 7,424,264 B2 * | 9/2008 | Hayashi et al. | 399/366 |
| 7,428,067 B2 * | 9/2008 | Kiwada | 358/1.14 |
| 7,455,216 B2 * | 11/2008 | Nagatsuka | 235/375 |
| 7,561,049 B2 * | 7/2009 | Rodgers | 340/572.1 |
| 2004/0044956 A1 * | 3/2004 | Huang | 715/511 |
| 2004/0184097 A1 * | 9/2004 | Suzuki | 358/1.15 |
| 2004/0193742 A1 * | 9/2004 | Ikeda | 710/1 |
| 2004/0196485 A1 * | 10/2004 | Hikichi et al. | 358/1.13 |
| 2004/0243801 A1 * | 12/2004 | Chen et al. | 713/160 |
| 2005/0094183 A1 * | 5/2005 | Kojima | 358/1.14 |
| 2005/0105140 A1 * | 5/2005 | Ozaki | 358/402 |
| 2005/0162697 A1 * | 7/2005 | Kiwada | 358/1.18 |
| 2006/0232411 A1 * | 10/2006 | Torchalski et al. | 340/572.1 |
| 2007/0014615 A1 * | 1/2007 | Kasayama et al. | 400/76 |
| 2007/0018785 A1 * | 1/2007 | Chi | 340/5.2 |
| 2008/0062451 A1 * | 3/2008 | Yamazaki | 358/1.14 |
| 2008/0169909 A1 * | 7/2008 | Park et al. | 340/10.4 |

FOREIGN PATENT DOCUMENTS

| | | | |
|---|---|---|---|
| JP | 11-348469 A | | 12/1999 |
| JP | 2000-285203 A | | 10/2000 |
| JP | 2000293648 A | * | 10/2000 |
| JP | 2002-337426 A | | 11/2002 |

* cited by examiner

PRINTING MEDIUM, IMAGE FORMING APPARATUS, AND PRINTING METHOD

BACKGROUND OF THE INVENTION

1. Field of the Invention

The present invention relates to a printing medium that can also store electronic data, to an image forming apparatus for printing an image on the printing medium, and to a method of printing on the printing medium, more particularly to a method that deters counterfeiting.

2. Description of the Related Art

The increasing quality of the images turned out by color copiers and other image forming apparatus has made the creation of faithful copies of printed matter a simple undertaking. There is accordingly a need for printing media equipped with effective means of preventing counterfeiting, that is, of preventing the illegal copying and use of printed matter having negotiable value, such as tickets and securities. Known means include both means for validating the image or information printed on the printing medium, and means that make the printing medium intrinsically difficult to copy. Both means may be employed simultaneously.

Known validation methods include the printing of a bar code generated from the printing data from which the printed image is generated, and the addition of predetermined information to the printing data, so that the printed image provides its own validation information. Known methods of making the printing medium difficult to copy include the addition of an optically variable mark such as a hologram to the printing medium. In a further method, disclosed in Japanese Unexamined Patent Application Publication No. 2000-285203, an integrated circuit (IC) chip is embedded in the printing medium to store validation data electronically; the validation data can be read from the IC chip to verify that the document printed on the printing medium is genuine.

Printing media incorporating an IC chip are secure from counterfeiting by image forming apparatus, because an image forming apparatus cannot copy the data stored in the IC chip, but such printing media are not useful unless they provide means of read and write access to the IC chip. In the above disclosure, read access and write access are virtually unrestricted, making it impossible to protect the secrecy of the data recorded in the IC chip. A suitably equipped counterfeiter can make an accurate copy of the negotiable security, ticket, or other image printed on the printing medium, then read the data recorded in the embedded IC chip and write identical data into a similar IC chip embedded in the copy, thereby producing a counterfeit copy that is substantially indistinguishable from the genuine original.

SUMMARY OF THE INVENTION

An object of the present invention is to provide a printing medium, image forming apparatus, and printing method that improve the secrecy of data electronically stored in the printing medium.

The present invention provides a printing medium that can also store electronic data. The printing medium includes an input-output unit, a first memory, a second memory, a comparison unit, and an access controller. The first memory stores authentication data. The comparison unit generates a comparison result by comparing the authentication data with comparison data. The input-output unit inputs the comparison data and outputs the comparison result. The second memory stores validation data corresponding to an image printed on a surface of the printing medium. The access controller controls write access to the second memory according to the comparison result generated by the comparison unit.

By making write access to the second memory conditional on the provision of comparison data and the result of a comparison between the comparison data and the authentication data stored in the first memory, the invention makes it difficult to create a counterfeit copy including correct validation data.

To make the creation of counterfeit copies even more difficult, the access controller may also control read access to the second memory. The printing medium may include an additional access controller for controlling write access to the first memory, so that additional data can be appended to the authentication data to provide still further security.

The invention also provides a method of printing on the invented printing medium, and an image forming apparatus for printing on the invented printing medium.

DETAILED DESCRIPTION OF THE INVENTION

Embodiments of the invention will now be described with reference to the attached drawings.

Figure 1:
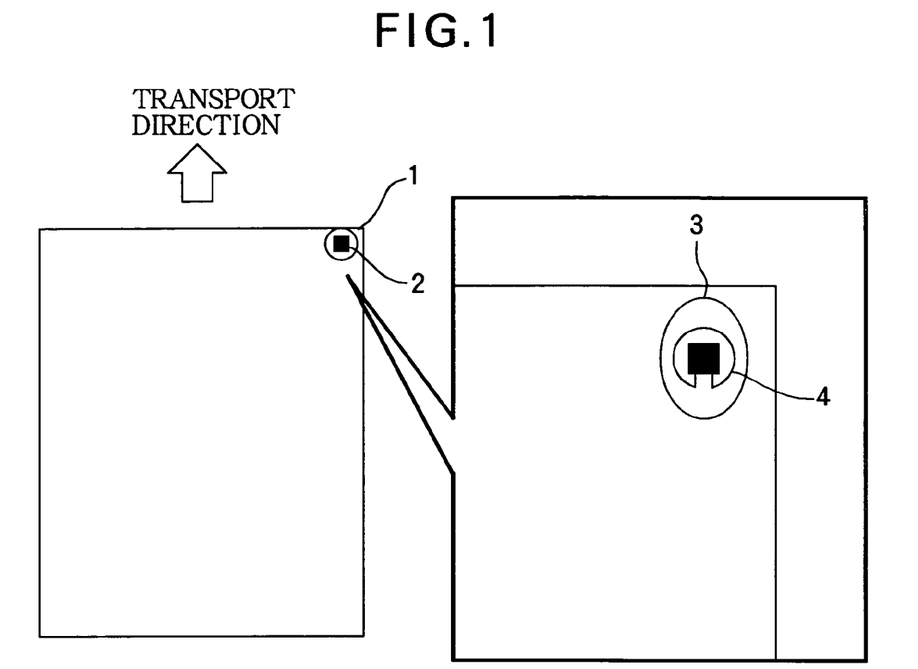
FIG. 1 illustrates the structure of a printing medium according to a first embodiment of the invention.

Referring to FIG. 1, the first embodiment is a printing medium 1 to which a small IC chip 2 is attached. The IC chip 2 is fastened to the printing medium 1 by an adhesive and is sealed by a heat-resistant seal 3. The IC chip 2, is surrounded by a loop antenna 4.

In FIG. 1, the IC chip 2 is attached near the front right corner of the printing medium 1 with respect to the direction in which the printing medium 1 is transported during printing, but the IC chip 2 may be attached anywhere, on either side of the printing medium 1, as long as it is located near the front of the printing medium 1 with respect to the printing transport direction. The IC chip 2 may be fastened to the printing medium 1 by any means that prevent removal from the printing medium 1; for example, the IC chip 2 may be inserted into the printing medium 1.

Figure 2:
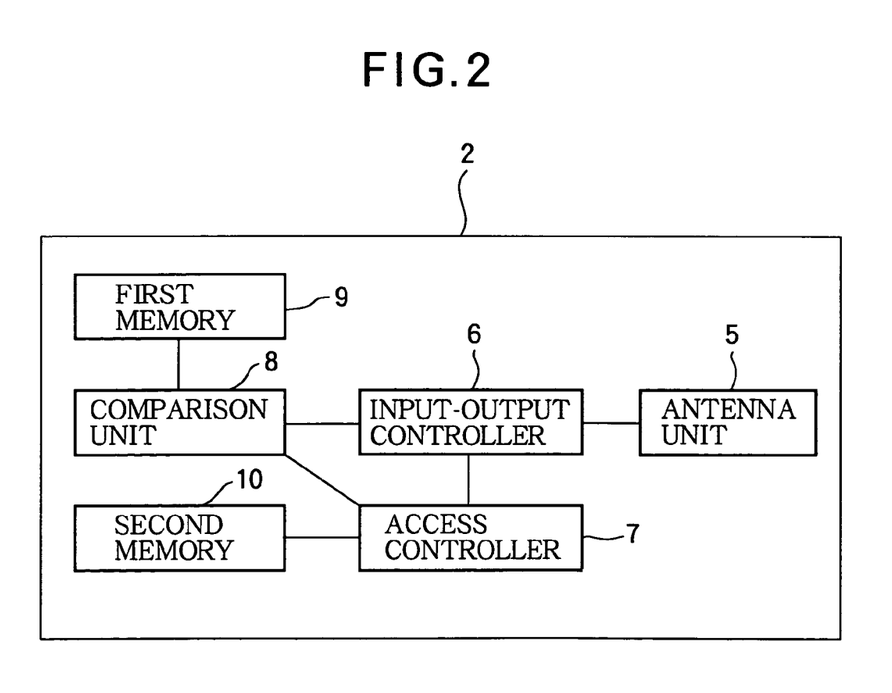
FIG. 2 is a block diagram showing the internal structure of the IC chip in the printing medium in FIG. 1.

Referring to FIG. 2, the IC chip 2 attached to the printing medium 1 comprises an antenna unit 5, an input-output controller 6, an access controller 7, a comparison unit 8, a first memory 9, and a second memory 10. The IC chip 2 uses a contactless communication system in which data are transmitted and received from the antenna unit 5 via the loop antenna 4 shown in FIG. 1. The antenna unit 5 also supplies power received via the loop antenna 4 to the IC chip 2. The input-output controller 6 controls the input and output of data received and transmitted from the antenna unit 5. The access controller 7 controls access to the data stored in the IC chip 2. The comparison unit 8 decides whether access to the data stored in the IC chip 2 is authorized or not. The first memory 9 and second memory 10 are both nonvolatile memories. Authentication data used in decision making by the comparison unit 8 are prestored in the first memory 9; validation data transmitted and received as described above are stored in the second memory 10.

Figure 3:
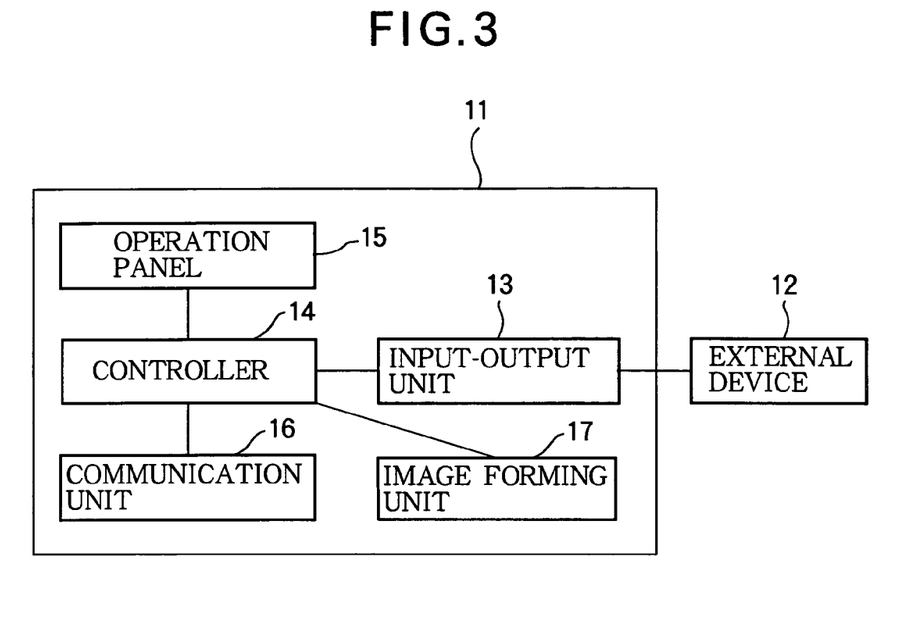
FIG. 3 is a block diagram of an image forming apparatus according to the first embodiment of the invention.

FIG. 3 illustrates an image forming apparatus 11 used in the first embodiment of the invention. The image forming apparatus 11 is connected to an external device 12 such as a personal computer or other information processing apparatus. The image forming apparatus 11 prints an image on the printing medium 1, and can also access the IC chip 2 to read and write data.

As shown in FIG. 3, the image forming apparatus 11 comprises an input-output unit 13, a controller 14, an operation panel 15, a communication unit 16, and an image forming unit 17.

The input-output unit 13 is an interface circuit that exchanges data with the external device 12. The input-output unit 13 may be, for example, a USB (universal serial bus) interface circuit, a LAN (local area network) interface circuit, or an RS-232C (Electronic Industries Association recommended standard No. 232 version C) interface circuit.

The controller 14 receives data from the input-output unit 13 and converts the received data into various forms, as well as controlling the entire image forming apparatus 11. The controller 14 includes a memory storing various embedded programs, a processor for executing these programs, and a work memory.

The operation panel 15 displays the status of the image forming apparatus 11 according to information received from the controller 14, and has buttons, keys, or other manual controls for input of various types of information, which is sent to the controller 14.

Figure 4:
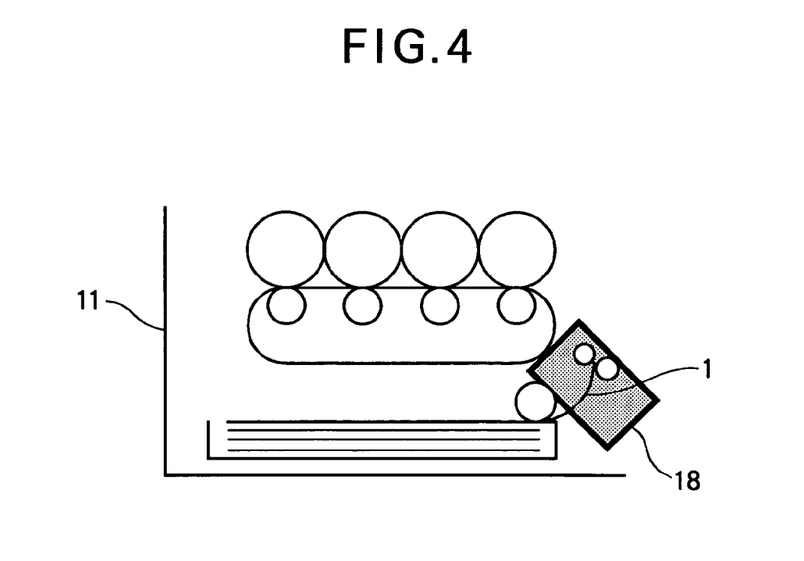
FIG. 4 is a diagram showing the region in which the communication unit in the image forming apparatus in FIG. 3 can communicate with the printing medium in FIG. 1.

The communication unit 16 exchanges data with the printing medium 1. Referring to FIG. 4, the communication unit 16 (not visible) in the image forming apparatus 11 can communicate with the printing medium 1 when the printing medium 1 is in a communication region 18. The conditions satisfied by the communication region 18 include, for example, enabling electromagnetic waves transmitted from the communication unit 16 to reach the printing medium 1 with a certain electric power, and not permitting the electromagnetic waves to reach any other printing media which are stacked or stored in preparation for printing.

The image forming unit 17 prints an image on a surface of the printing medium 1 as it is transported through the image forming apparatus 11.

The printing medium 1 incorporating the IC chip 2 may be used for various purposes. To address the problems of the prior art described above, the following descriptions will assume that the printing medium 1 is used for printing a negotiable security.

To make the printing medium 1 into a negotiable security incorporating the IC chip 2, two processes must be performed: first, the title and other information of the security must be printed on the printing medium 1, and second, information that can certify the validity of the printing medium 1 when it is used as a negotiable security must be stored in the second memory 10 of the IC chip 2. The validity of the negotiable security is verified by comparing the information printed on the printing medium 1 with the information (validation data) stored in the second memory 10.

The validation data are stored in the second memory 10 when an image is printed on the printing medium 1, to certify the validity of the image printed on the printing medium 1. In this first embodiment, it is assumed that the information printed on the printing medium 1 includes at least the price of the negotiable security, and that the price data are used as the validation data. In practice, the validation data may be any data that can be compared with the image printed on the printing medium 1 for verification purposes. Instead of price data, the validation data may be, for example, issuer data, owner data, or issue date data, or an encrypted form of any of these data.

To write the validation data when the external device 12 requests printing of the negotiable security by sending data to be printed, the comparison unit 8 first decides whether to permit write access to the second memory 10. If write access is permissible, the input-output controller 6 transfers the validation data received via the antenna unit 5 to the access controller 7, which writes the transferred validation data into the second memory 10. If write access is not permissible, the receiving and writing of the validation data are not carried out.

To read the validation data when the external device 12 requests reading of data to verify the authenticity of the negotiable security, the comparison unit 8 first decides whether to permit read access to the second memory 10. If read access is permissible, the access controller 7 reads the validation data from the second memory 10 and transfers the validation data to the input-output controller 6, which transmits the transferred data via the antenna unit 5. If read access is not permissible, the reading and transmitting of the validation data are not carried out.

The authentication data prestored in the first memory 9 are used to decide whether to permit these read and write accesses. The authentication data are prestored in the first memory 9 before the IC chip 2 is attached to the printing medium 1, and used to authorize access to the IC chip 2. The authentication data may be any data associated with the printing medium 1, such as data identifying the manufacturer of the IC chip 2, data identifying the security issuer who performs printing on the printing medium 1, data identifying the media type of the printing medium 1, or serial number data. In this first embodiment, data identifying the media type of the printing medium 1 (media data) are employed as authentication data.

The image forming apparatus 11 is thus equipped both to print a negotiable security on the printing medium 1 and to read and write the security price data in the second memory 10. Printing is carried out according to printing data sent from the external device 12 to the input-output unit 13. The controller 14 receives the printing data from the input-output unit 13, and converts the received printing data into image data to be printed on the printing medium 1 and security price data to be stored in the second memory 10, while transporting or pre-feeding the printing medium 1 to a predetermined location in the communication region 18. Subsequently, the controller 14 causes the operation panel 15 to display a prompt for input of comparison data. After the operator of the image forming apparatus 11 enters the comparison data on the operation panel 15, the controller 14 sends the comparison data to the printing medium 1 via the communication unit 16 to confirm the possibility of write access to the second memory 10.

After sending the comparison data, the controller 14 receives a comparison result from the printing medium 1 via the communication unit 16. If the comparison result indicates that data can be written in the printing medium 1, the image forming unit 17 performs printing on the printing medium 1 while the communication unit 16 sends the security price data to the IC chip 2 attached to the printing medium 1. If data cannot be written, printing is canceled and the printing medium 1 is fed back from the communication region 18 into the tray shown at the bottom of FIG. 4. Alternatively, the printing medium 1 may be fed through the image forming apparatus 11 and ejected with no printing performed, so that the surface of the printing medium 1 remains blank. The conversion of the printing data to image data may also be delayed until the comparison result has been received, and performed only if the comparison result indicates that the writing of data is possible.

When the security price data stored in the second memory 10 are read, a read request sent by the external device 12 initiates processing by the controller 14, in which the comparison data entered on the operation panel 15 is sent to the printing medium 1 to confirm whether read access to the printing medium 1 is permissible or not. If read access is permissible, the security price data received from the printing medium 1 are displayed on the operation panel 15. If read access is not permissible, an error message is displayed on the operation panel 15. Alternatively, the price data and/or error message may be displayed on the external device 12 instead of the operation panel 15.

Figure 5A:
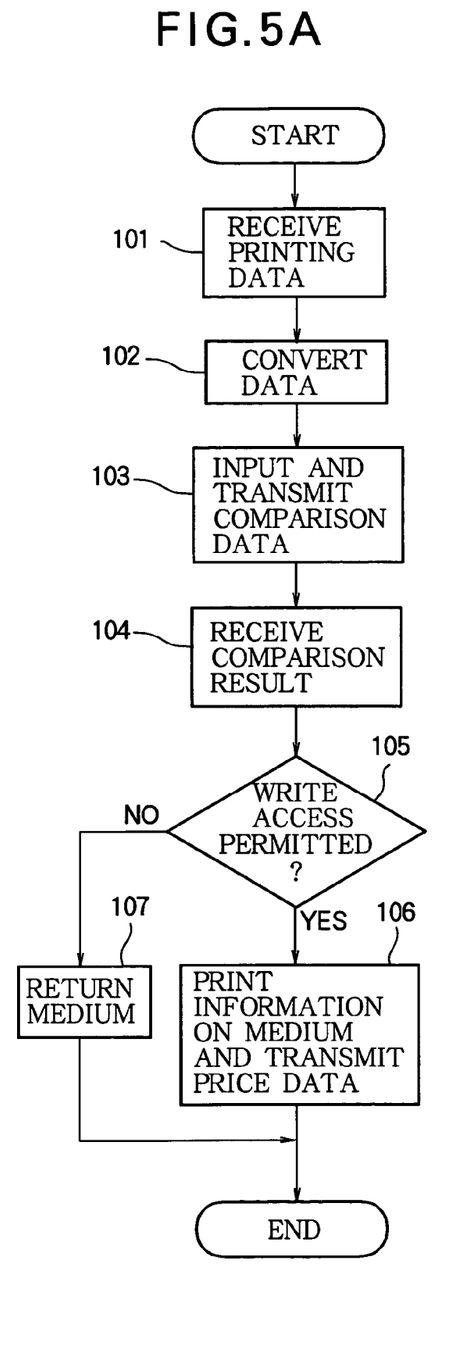
FIGS. 5A and 5B are flowcharts illustrating the printing operation and the writing of data in the first embodiment.
Figure 5B:
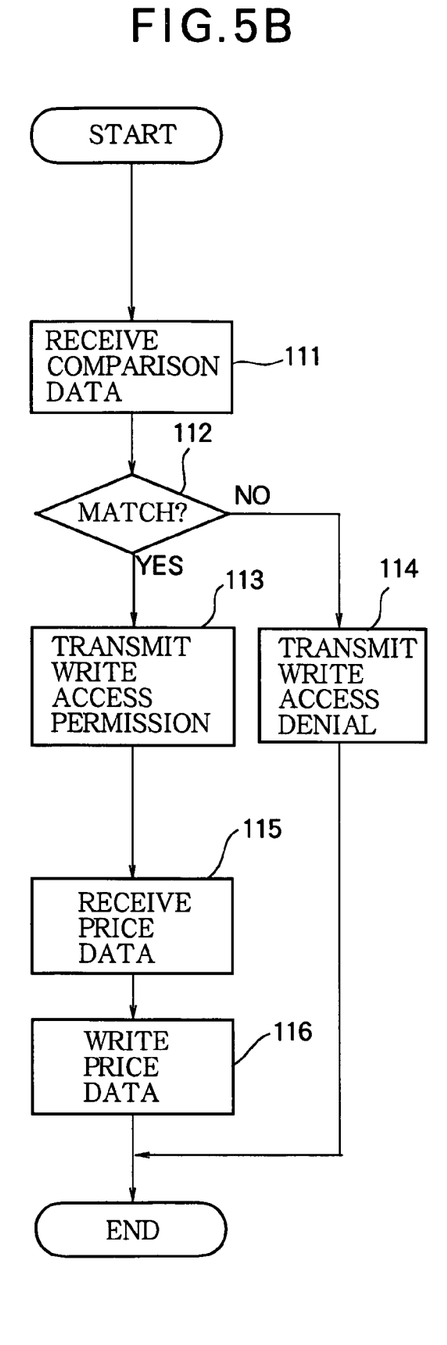

The flowcharts in FIGS. 5A and 5B illustrate the image printing and data writing operations in the first embodiment. FIG. 5A shows operations performed by the image forming apparatus 11; FIG. 5B shows operations performed by the IC chip 2. The printing and writing operations will be described below with reference to these flowcharts.

First, the controller 14 in the image forming apparatus 11 receives printing data from the external device 12 via the input-output unit 13 (step 101 in FIG. 5A). While pre-feeding the printing medium 1, the controller 14 converts the received printing data by executing an embedded program to generate image data to be printed on the printing medium 1 and price data to be sent to the printing medium 1 (step 102).

After completion of the above data conversion, the controller 14 requests the entry on the operation panel 15 of comparison data necessary for authorization of write access to the second memory 10, and sends the entered comparison data to the printing medium 1 via the communication unit 16 (step 103).

The IC chip 2 transfers the above comparison data received via the antenna unit 5 to the comparison unit 8 via the input-output controller 6 (step 111 in FIG. 5B). The comparison unit 8 compares the received comparison data with the authentication data (media data) prestored in the first memory 9, and decides from the comparison result whether data can be written into the second memory 10 (step 112). If the comparison result indicates that the comparison data match the authentication data, the comparison unit 8 sends a write access permission signal through the input-output controller 6 and antenna unit 5, notifying the image forming apparatus 11 that writing of data is possible, while sending the same notification to the access controller 7 in the IC chip 2 (step 113). If the comparison result indicates that the comparison and authentication data do not match, the comparison unit 8 sends a write access denial signal through the input-output controller 6 and antenna unit 5, notifying the image forming apparatus 11 that writing of data is not possible (step 114).

The communication unit 16 in the image forming apparatus 11 receives the comparison result sent from the IC chip 2 and transfers it to the controller 14 (step 104 in FIG. 5A), which decides from the comparison result whether data can be written or not (step 105). If the comparison result indicates that data can be written, the controller 14 controls the image forming unit 17 to print the image data on the pre-fed printing medium 1, and sends the price data to the printing medium 1 via the communication unit 16 (step 106). If the above comparison result indicates that data cannot be written, the controller 14 returns the pre-fed printing medium 1 to the printer tray without printing (step 107).

If the IC chip 2 sends a write access permission signal (in step 113 in FIG. 5B), the price data received via the antenna unit 5 are sent to the access controller 7 via the input-output controller 6 (step 115) and written into the second memory 10 by the access controller 7 (step 116). If the IC chip 2 sends a write access denial signal (in step 114), the price data are not written into the second memory 10.

Figure 6A:
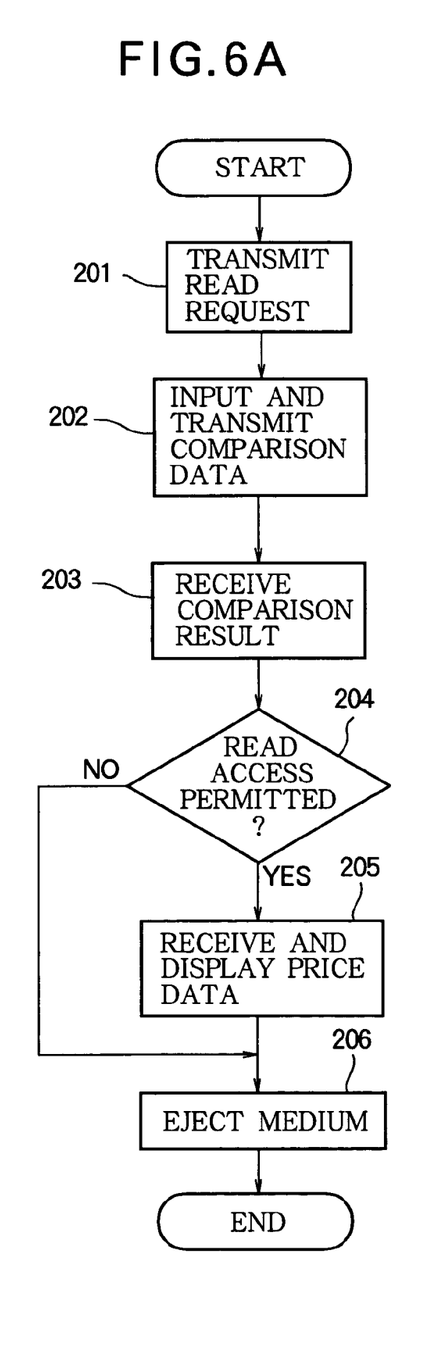
FIGS. 6A and 6B are flowcharts illustrating the reading of data in the first embodiment.
Figure 6B:
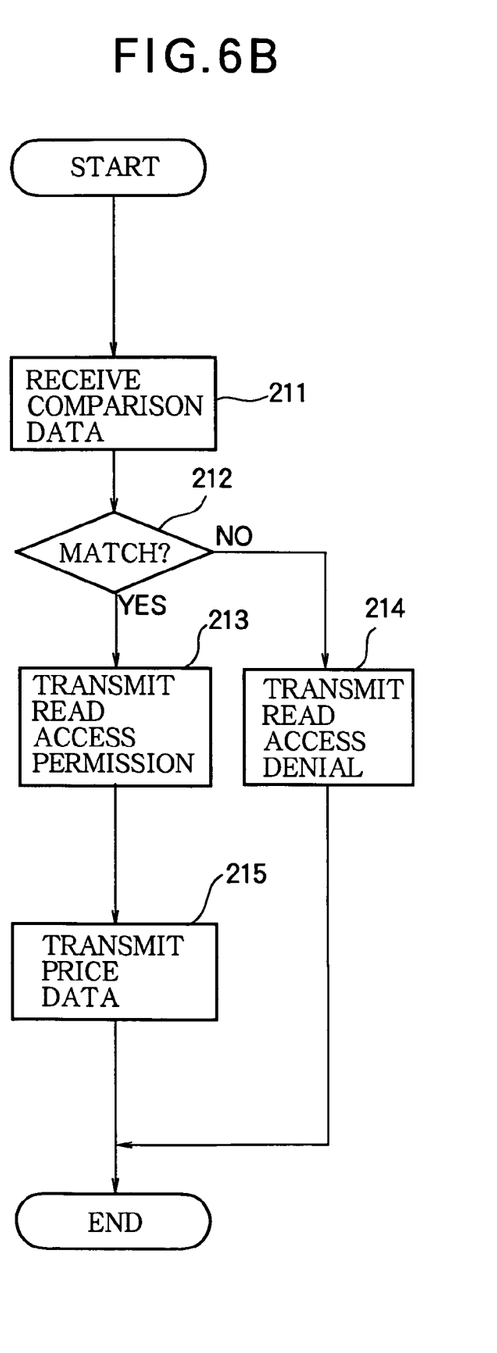

FIGS. 6A and 6B are flowcharts illustrating the reading of data in the first embodiment. FIG. 6A shows operations performed by the image forming apparatus 11; FIG. 6B shows operations performed by the IC chip 2. The reading of data will be described below with reference to these flowcharts.

First, the controller 14 in the image forming apparatus 11 receives a read request from the external device 12 via the input-output unit 13 (step 201 in FIG. 6A). The controller 14 then executes an embedded program that causes the operation panel 15 to display a prompt for entry of the comparison data necessary to authorize the reading of data from the second memory 10, and sends the entered comparison data to the printing medium 1 via the communication unit 16, while pre-feeding the printing medium 1 (step 202).

The IC chip 2 attached to the pre-fed printing medium 1 transfers the comparison data received via the antenna unit 5 to the comparison unit 8 via the input-output controller 6 (step 211 in FIG. 6B). The comparison unit 8 compares the received comparison data with the authentication (media) data prestored in the first memory 9, and decides from the comparison result whether data can be read from the second memory 10 nor not (step 212). If the comparison result indicates that the comparison and authentication data match, the comparison unit 8 sends a read access permission signal to the access controller 7, and to the image forming apparatus 11 via the input-output controller 6 and antenna unit 5, indicating that data can be read (step 213). If the comparison result indicates that the comparison and authentication data do not match, the comparison unit 8 sends a read access denial signal to the image forming apparatus 11 via the input-output controller 6 and antenna unit 5, indicating that data cannot be read (step 214). When data can be read, the access controller 7 reads the price data stored in the second memory 10 and transfers the price data to the input-output controller 6, which sends the transferred price data to the image forming apparatus 11 via the antenna unit 5 (step 215).

In the image forming apparatus 11, the comparison result sent from the IC chip 2 is received by the communication unit 16 and transferred to the controller 14 (step 203 in FIG. 6A). The controller 14 then decides from the comparison result whether reading of data is possible or not (step 204). If the comparison result indicates that reading of data is possible, the controller 14 receives the price data sent from the IC chip 2 attached to the pre-fed printing medium 1 via the communication unit 16, converts the price data to data that can be displayed on the operation panel 15 by executing an embedded program, displays the converted data on the operation panel 15 (step 205) and ejects the pre-fed printing medium 1 (step 206). If the comparison result indicates that reading of data is not possible, the controller 14 displays an error message and ejects the pre-fed printing medium 1 (step 206).

As described above, according to the first embodiment, access to the data stored in the IC chip 2 is allowed only when entered comparison data match the authentication data prestored in the IC chip 2, whereby access to the IC chip 2 can be restricted and the secrecy of the data stored therein can be improved, making the counterfeiting process more difficult.

Next, a second embodiment of the invention will be described.

Figure 7:
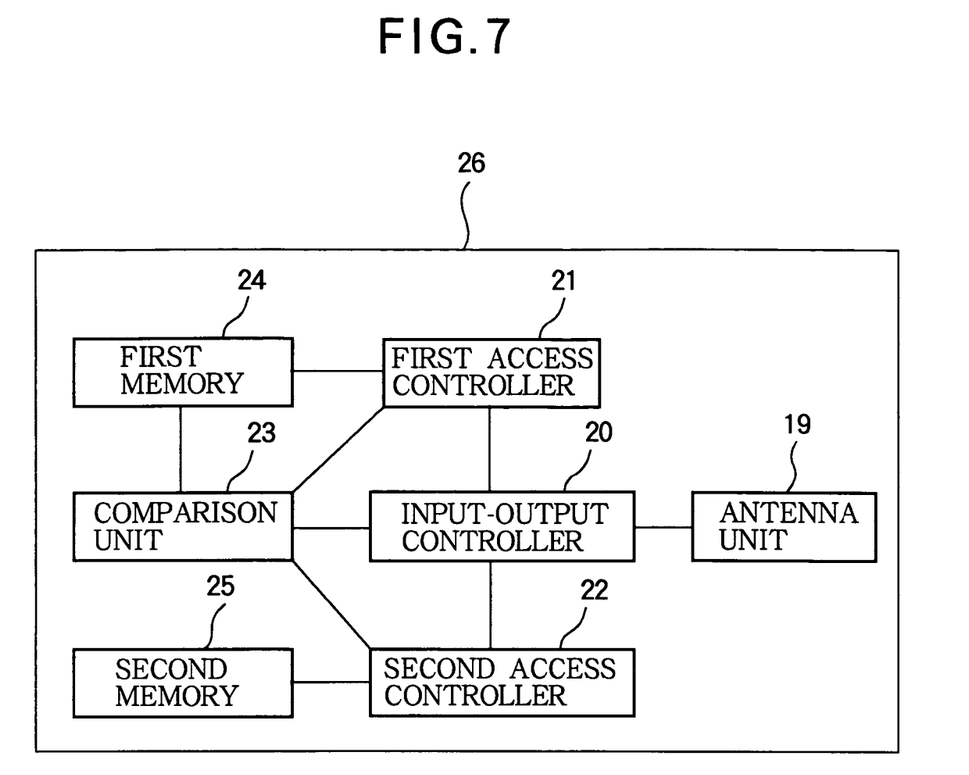
FIG. 7 is a block diagram showing the internal structure of the IC chip in a second embodiment of the invention.

FIG. 7 is a block diagram showing the internal structure of the IC chip in the second embodiment of the invention. The IC chip 26 in FIG. 7 corresponds to the IC chip 2 of the printing medium 1 in the first embodiment shown in FIG. 1. The image forming apparatus in the second embodiment of the invention is identical to the image forming apparatus in the first embodiment shown in FIGS. 3 and 4.

As shown in FIG. 7, the IC chip 26 comprises an antenna unit 19, an input-output controller 20, a first access controller 21, a second access controller 22, a comparison unit 23, a first memory 24, and a second memory 25. The operations of these blocks are similar to those of the antenna unit, input-output controller, access controller, comparison unit, first memory, and second memory in the first embodiment described above. As in the first embodiment, the IC chip 26 uses a contactless communication system in which data are transmitted and received from the antenna unit 19 via the loop antenna 4 shown in FIG. 1. The antenna unit 19 also supplies power received via the loop antenna 4 to the IC chip 26. The input-output controller 20 controls the input and output of data received and transmitted from the antenna unit 19. The first access controller 21 and second access controller 22 control access to the data stored in the IC chip 26. The comparison unit 23 decides whether access to the data stored in the IC chip 26 is authorized or not. The first memory 24 and second memory 25 are both nonvolatile memories permitting read and write access, and the first memory 24 permits repeated write access. Authentication data used in decision making by the comparison unit 23 are stored in the first memory 24; the authentication data include both prestored authentication data and additional data transmitted and received as described above; validation data transmitted and received as described above are stored in the second memory 25.

The printing medium 1 incorporating the IC chip 26 in the second embodiment may be used for various purposes. To address the problems of the prior art described above, as in the first embodiment, it will be assumed that the printing medium 1 is used for printing a negotiable security. Repeated descriptions of the image forming apparatus will be omitted, since this apparatus was described in the first embodiment.

To make the printing medium 1 shown in FIG. 1 into a negotiable security incorporating the IC chip 26 in the second embodiment, two processes must be performed: first, the title and other information of the security must be printed on the printing medium 1, and second, information that can certify the validity of the printing medium 1 when it is used as a negotiable security must be stored in the second memory 25 of the IC chip 26 as validation data. The validity of the negotiable security is verified by comparing the information printed on the printing medium 1 with the validation data stored in the second memory 25.

The validation data are stored in the second memory 25 when an image is printed on the printing medium 1, to certify the validity of the image printed on the printing medium 1. As in the first embodiment, it is assumed that the information printed on the printing medium 1 includes at least the price of the negotiable security, and that the price data are used as validation data. In practice, the validation data may be any data that can be compared with the image printed on the printing medium 1 to verify the image. Instead of price data, the validation data may be, for example, issuer data, owner data, or issue date data, or an encrypted form of any of these data.

To write the validation data when the external device 12 requests printing of the negotiable security by sending the printing data, the comparison unit 23 first decides whether to permit write access to the second memory 25. If write access is permissible, the input-output controller 20 transfers additional data received via the antenna unit 19 to the first access controller 21, and transfers validation data, also received via the antenna unit 19, to the second access controller 22. The first access controller 21 writes the additional data into the first memory 24, appending the additional data to the authentication data already stored in the first memory 24; the second access controller 22 writes the validation data into the second memory 25. If write access is not permissible, the additional data and validation data are not received and written.

The authentication data prestored in the first memory 24 are used to decide whether these write accesses to the first and second memories 24, 25 are permissible. These authentication data are prestored in the first memory 24 before the IC chip 26 is attached to the printing medium 1, and do not include the additional authentication data appended later. The prestored authentication data may be any data associated with the printing medium 1, such as data identifying the manufacturer of the IC chip 26, data identifying the security issuer who performs printing on the printing medium 1, data identifying the media type of the printing medium 1, or serial number data. In this second embodiment, as in the first embodiment, data identifying the media type of the printing medium 1 (media data) are employed as the prestored authentication data.

To read the validation data when the external device 12 requests reading of data to verify the authenticity of the negotiable security, the comparison unit 23 first decides whether read access to the validation data stored in the second memory 25 is permissible. If read access is permissible, the second access controller 22 reads the validation data from the second memory 25 and transfers the validation data to the input-output controller 20, which transmits the transferred data via the antenna unit 19. If read access is not permissible, reading and transmitting of the validation data are not carried out.

Both the authentication data prestored in the first memory 24 and the additional data appended to the prestored authentication data are used to decide whether the above read access is possible or not. The additional data appended to the prestored authentication data may be any data associated with the printing medium 1 or the image printed on the printing medium 1, such as data identifying the manufacturer of the IC chip 26, data identifying the security issuer who performs printing on the printing medium 1, data identifying the media type of the printing medium 1, data identifying the owner of the image printed on the printing medium 1 or a person having right of access thereto, or serial number data. In the description below, data identifying the owner of the image printed on the printing medium 1 or a person having right of access thereto (authorization data) are employed as the additional data.

As described above, the authenticity of the negotiable security in the second embodiment is verified as in the first embodiment, by reading the validation data stored in the second memory 25, but the decision as to whether to permit read access to the second memory 25 is made on the basis of both the authentication data prestored in the first memory 24 and the authorization data appended as additional authentication data when the negotiable security was printed on the printing medium 1. In the second embodiment, therefore, a person attempting to perform read access must be in possession of both the prestored authentication data (in this case, media data) and the additional data (in this case, authorization data).

The controller 14 in the image forming apparatus 11, shown in FIGS. 3 and 4, receives printing data from the input-output unit 13, and converts the received printing data into image data to be printed on the printing medium 1, authorization data to be additionally stored in the first memory 24, and security price data to be stored in the second memory 25. The communication unit 16 transmits both the authorization data and the security price data to the IC chip 26. Aside from these differences, the image forming apparatus 11 operates as described in the first embodiment.

The flowcharts in FIGS. 5A and 5B, which illustrate the printing of an image and writing of data in the first embodiment, also describe the printing and writing operations in the second embodiment, because these operations are the same as in the first embodiment, except for modifications made necessary by the authorization data. The modifications will be explained in the description below. FIG. 5A shows operations performed by the image forming apparatus 11; FIG. 5B shows operations performed by the IC chip 26.

First, the controller 14 in the image forming apparatus 11 receives printing data from the external device 12 via the input-output unit 13 (step 101 in FIG. 5A). While pre-feeding the printing medium 1, the controller 14 converts the received printing data by executing an embedded program to generate image data to be printed on the printing medium 1 and price data to be sent to the printing medium 1 (step 102).

After completion of the above data conversion, the controller 14 requests the entry on the operation panel 15 of comparison data necessary for authorization of write access to the first memory 24 and second memory 25, and sends the entered comparison data to the printing medium 1 via the communication unit 16 (step 103).

The IC chip 26 transfers the above comparison data, which are received via the antenna unit 19, to the comparison unit 23 via the input-output controller 20 (step 111 in FIG. 5B). The comparison unit 23 compares the received comparison data with the authentication data (media data) prestored in the first memory 24, and decides from the comparison result whether to permit data to be written into the second memory 25 (step 112). If the comparison result indicates that the comparison data match the authentication data, the comparison unit 23 sends a write access permission signal through the input-output controller 20 and antenna unit 19 to notify the image forming apparatus 11 that writing of data is possible, while sending the same notification to the first access controller 21 and second access controller 22 in the IC chip 26 (step 113). If the comparison result indicates that the comparison and authentication data do not match, the comparison unit 23 sends a write access denial signal through the input-output controller 20 and antenna unit 19 to notify the image forming apparatus 11 that writing of data is not possible (step 114).

The communication unit 16 in the image forming apparatus 11 receives the comparison result sent from the IC chip 26 and transfers it to the controller 14 (step 104 in FIG. 5A), which decides from the comparison result whether data can be written or not (step 105). If the comparison result indicates that data can be written, the controller 14 controls the image forming unit 17 to print the image data on the pre-fed printing medium 1, and sends the authorization data and price data to the printing medium 1 via the communication unit 16 (step 106). If the above comparison result indicates that data cannot be written, the controller 14 returns the pre-fed printing medium 1 to the printer tray without printing (step 107).

If the IC chip 26 sends a write access permission signal (in step 113 in FIG. 5A), the above authorization data and price data, which are received via the antenna unit 19, are sent to the first access controller 21 and second access controller 22, respectively, via the input-output controller 20 (step 115). The first access controller 21 writes the authorization data into the first memory 24; the second access controller 22 writes the price data into the second memory 25 (step 116). If the IC chip 26 sends a write access denial signal (in step 114), no data are written into the first memory 24 and second memory 25.

The flowcharts in FIGS. 6A and 6B, which illustrate the reading of data in the first embodiment, also illustrate the reading operation in the second embodiment because the reading operation is the same as in the first embodiment except for modifications made necessary by the authorization data. These modifications will be explained in the description below. FIG. 6A shows operations performed by the image forming apparatus 11; FIG. 6B shows operations performed by the IC chip 26.

First, the controller 14 in the image forming apparatus 11 receives a read request from the external device 12 via the input-output unit 13 (step 201 in FIG. 6A). The controller 14 then executes an embedded program that causes the operation panel 15 to display a prompt for entry of the comparison data necessary to authorize the reading of data from the second memory 25. After the operator of the image forming apparatus 11 enters the comparison data, the controller 14 sends the comparison data to the printing medium 1 via the communication unit 16, while pre-feeding the printing medium 1 (step 202). The entered comparison data must include both the prestored authentication data and the additional authorization data.

The IC chip 26 attached to the pre-fed printing medium 1 transfers the comparison data received via the antenna unit 19 to the comparison unit 23 via the input-output controller 20 (step 211 in FIG. 6B). The comparison unit 23 compares the received comparison data with the data (including the authorization data) stored in the first memory 24, and decides from the comparison result whether data can be read from the second memory 25 nor not (step 212). If the comparison result indicates that the comparison data match the authentication data and additional data stored in the first memory 24, the comparison unit 23 sends a read access permission signal to the second access controller 22, and to the image forming apparatus 11 via the input-output controller 20 and antenna unit 19, indicating that data can be read (step 213). If the comparison result indicates that the comparison data and stored data do not match, the comparison unit 23 sends a read access denial signal to the image forming apparatus 11 via the input-output controller 20 and antenna unit 19, indicating that data cannot be read (step 214). When data can be read, the second access controller 22 reads the price data stored in the second memory 25 and transfers the price data to the input-output controller 20, which sends the transferred price data to the image forming apparatus 11 via the antenna unit 19 (step 215).

In the image forming apparatus 11, the comparison result sent from the IC chip 26 is received by the communication unit 16 and transferred to the controller 14 (step 203 in FIG. 6A). The controller 14 then decides from the comparison result whether reading of data is permissible or not (step 204). If the comparison result indicates that reading of data is permissible, the controller 14 receives the price data sent from the IC chip 26 of the pre-fed printing medium 1 via the communication unit 16, converts the price data to data that can be displayed on the operation panel 15 by executing an embedded program, displays the converted data on the operation panel 15 (step 205) and ejects the pre-fed printing medium 1 (step 206). If the comparison result indicates that reading of data is not permissible, the controller 14 displays an error message and ejects the pre-fed printing medium 1 (step 206).

As described above, the second embodiment provides a further degree of protection against counterfeiting by requiring the counterfeiter to know two types of data (authentication data and authorization data) that cannot be read from the IC chip 26. In particular, the authorization data can be uniquely determined by the person who operates the input-output unit 13 when the original negotiable security is printed on the printing medium 1, making it very difficult for the counterfeiter to determine what the authorization data are.

In the first and second embodiments, the communication region 18 in which the image forming apparatus 11 and printing medium 1 can communicate with each other is located in the area into which the printing medium 1 is pre-fed, but the communication region 18 may be located anywhere, provided the location enables the image forming apparatus 11 to reliably distinguish the printing medium 1 with which it wants to communicate from other printing media stacked in the printer tray. The IC chip may also be mounted anywhere on the printing medium 1 as long as the IC chip is located in the communication region 18 during the time when communication must take place.

The above embodiments have been described in relation to the printing of a negotiable security, but the present invention can also be practiced with other matter printed on printing media that can store electronic data, especially if the printed matter is printed, read, and written exclusively by a particular administrative organization. Such printed matter includes various kinds of certificates and tickets, business documents such as contracts and applications, and copyright matter using paper media such as posters and compact disc (CD) jackets Those skilled in the art will recognize that further variations are possible within the scope of the invention, which is defined in the appended claims.

What is claimed is:

1. A method of printing on a printing medium, the medium including a printable area in which image data is to be printed and a memory area in which authentication data has been previously stored, the method comprising:
   receiving printing data from an external apparatus and comparison data from a user;
   generating, from the printing data, both the image data to be printed and validation data that validates the genuineness of the image data after printing;
   sending the comparison data to the printing medium to be compared in the printing medium with the authentication data to generate a comparison result;
   receiving the comparison result from the printing medium and deciding from the comparison result whether the validation data can be written in the printing medium;
   printing the image data in the printable area and sending the validation data to the printing medium to be written to the memory area if the comparison result indicates that the validation data can be written in the printing medium; and
   refraining from printing the image data and refraining from sending the validation data to the printing medium if the comparison result indicates that the validation data cannot be written in the printing medium.

2. The method of claim 1, wherein the validation data duplicates a portion of the printed image data.

3. An image forming apparatus for printing on a printing medium the medium including a printable area in which an image is printed and a memory area in which authentication data has been previously stored, the apparatus comprising:
   an operation unit for input of comparison data by an operator;
   a communication unit for transmitting the comparison data to the printing medium and receiving a comparison result from the printing medium, the comparison result being generated by comparing in the printing medium the authentication data with the comparison data; and
   a controller for receiving printing data from an external apparatus and generating therefrom both image data to be printed in the printable area and validation data that validates the genuineness of the image data after printing, and fix deciding from the comparison result received from the communication unit whether the image data can be written in the printing medium; wherein,
   if the controller decides that validation data can be written in the printing medium, the image forming apparatus prints the image data in the printable area and the communication unit sends the validation data to the memory area printing medium; and
   if the controller decides that validation data cannot be written in the printing medium, the image forming apparatus does not print the image data on the printing medium and the communication unit does not send the validation data to the memory area.

4. The image forming apparatus of claim 3, wherein, when the validation data cannot be written in the printing medium, the operation unit displays a corresponding indication.

5. The image forming apparatus of claim 3, wherein, when the validation data cannot be written in the printing medium, the image forming apparatus notifies the external device.

6. The image forming apparatus of claim 3, wherein:
   the controller also decides, from the comparison result, whether the validation data can be read from the printing medium;
   if the validation data cannot be read from the printing medium, the operation unit displays a corresponding indication; and
   if the validation data can be read from the printing medium, the communication unit receives the validation data from the printing medium and the operation unit displays the received validation data.

7. The image forming apparatus of claim 3, wherein:
   the controller also decides, from the comparison result, whether the validation data can be read from the printing medium;
   if the validation data cannot be read from the printing medium, the controller notifies the external device accordingly; and
   if the validation data can be read from the printing medium, the communication unit receives the validation data from the printing medium and the controller sends the received validation data to the external device.

8. The image forming apparatus of claim 3, wherein the communication unit communicates with the printing medium when the printing medium has been transported to a predetermined location in the image forming apparatus.

9. The image forming apparatus of claims 2, wherein the validation data duplicates a portion of the printed image data.

10. A method of printing on a printing medium said printing medium including a printable area in which an image is printed and a memory area in which authentication data has been previously stored, the method comprising:
    receiving printing data from an external apparatus and comparison data from a user;
    generating from the printing data, image data to be printed in the printable area, additional data to be added to the authentication data, and said validation data that validates the genuineness of the image data after printing;

sending the comparison data to the printing medium to be compared in the printing medium with the authentication data and the additional data to generate a comparison result;

receiving the comparison result from the printing medium and deciding from the comparison result whether the validation data can be written in the printing medium;

printing the image data in the printable area and sending the validation data and the additional data to the printing medium so that the validation data and additional data is written in the memory area if the comparison result indicates that the validation data can be written in the printing medium; and refraining from printing the image data and refraining from sending the validation data and the additional data to the printing medium if the comparison result indicates that the validation data cannot be written in the memory area.

11. The method of claim 10, wherein the additional data identifies either the owner of the image printed on the printing medium or a person having right of access thereto.

12. The method of claim 10, wherein the validation data duplicates a portion of the printed image data.

13. An image forming apparatus for printing on a printing medium including a printable area in which an image is printed and a memory area in which authentication data has been previously stored, the apparatus comprising:

an operation unit for input of comparison data by an operator;

a communication unit for sending the comparison data to the printing medium and receiving a comparison result from the printing medium, the comparison result being generated in the printing medium by comparing the authentication data and additional data with the comparison data; and a controller for receiving printing data from an external apparatus and generating therefrom image data to be printed in the printable area, the additional data to be added to the authentication data, and validation data that validates the genuineness of the image data after printing, said controller deciding from the comparison result whether the validation data can be written in the printing medium; wherein, if the controller decides that the validation data can be written in the printing medium, the image forming apparatus prints the image data in the printable area and the communication unit sends the additional data and the validation data to the printing medium; and if the controller decides that the validation data cannot be written in the printing medium, the image forming apparatus does not perform printing and the communication unit does not send the additional data and the validation data to the memory area.

14. The image forming apparatus of claim 13, wherein, when the validation data cannot be written in the printing medium, the operation unit displays a corresponding indication.

15. The image forming apparatus of claim 13, wherein, when the validation data cannot be written in the printing medium, the image forming apparatus notifies the external device.

16. The image forming apparatus of claim 13, wherein:

the controller also decides, from the comparison result, whether the validation data can be read from the printing medium; and if the validation data cannot be read from the printing medium, the operation unit displays a corresponding indication; and if the validation data can be read from the printing medium, the communication unit receives the validation data from the printing medium and the operation unit displays the received validation data.

17. The image forming apparatus of claim 13, wherein:

the controller also decides, from the comparison result, whether the validation data can be read from the printing medium; and if the validation data cannot be read from the printing medium, the controller notifies the external device accordingly; and if the validation data can be read from the printing medium, the communication unit receives the validation data from the printing medium and the controller sends the received validation data to the external device.

18. The image forming apparatus of claim 13, wherein the communication unit communicates with the printing medium when the printing medium has been transported to a predetermined location in the image forming apparatus.

19. The image forming apparatus of claim 13, wherein the additional data identifies either the owner of the image printed on the printing medium or a person having right of access thereto.

20. The image forming apparatus of claims 13, wherein the validation data duplicates a portion of the printed image data.

* * * * *

UNITED STATES PATENT AND TRADEMARK OFFICE
CERTIFICATE OF CORRECTION

PATENT NO. : 7,649,641 B2 Page 1 of 1
APPLICATION NO. : 10/876153
DATED : January 19, 2010
INVENTOR(S) : Yasutaka Fujinuma It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1548 days.

Signed and Sealed this

Twenty-third Day of November, 2010

David J. Kappos
*Director of the United States Patent and Trademark Office*